United States Patent
Kuhn et al.

[11] Patent Number: 5,249,955
[45] Date of Patent: Oct. 5, 1993

[54] BURNER AND IGNITOR ARRANGEMENT

[75] Inventors: Emil Kuhn, Baden; Hans P. Knöpfel, Besenbüren; Hans Peter, Urdorf; Claude Pelet, Lonay, all of Switzerland

[73] Assignee: Asea Brown Boveri Ltd., Baden, Switzerland

[21] Appl. No.: 902,735

[22] Filed: Jun. 23, 1992

[30] Foreign Application Priority Data

Jul. 3, 1991 [CH] Switzerland ............ 1967/91

[51] Int. Cl.⁵ ............ F23D 17/00; F23D 11/40; F23R 3/02
[52] U.S. Cl. ............ 431/265; 431/264; 431/173
[58] Field of Search ............ 431/8, 10, 11, 173, 431/264, 265

[56] References Cited

U.S. PATENT DOCUMENTS

| | | | |
|---|---|---|---|
| 2,464,791 | 3/1949 | Bonvillian et al. | 431/173 |
| 2,465,712 | 3/1949 | Clarkson | 431/173 |
| 3,758,261 | 9/1973 | Galliano, Jr. | 431/173 X |
| 3,804,578 | 4/1974 | Robbins | 431/173 X |
| 4,404,931 | 9/1983 | Smith et al. | 431/265 X |
| 4,932,861 | 6/1990 | Keller et al. | 431/8 |

FOREIGN PATENT DOCUMENTS 0210462 2/1987 European Pat. Off. .
0321809 6/1989 European Pat. Off. .

OTHER PUBLICATIONS

"Some Fundamentals of Combustion", D. B. Spalding, et al., *Butterworths Scientific Publications*, 1955, pp. 232-233.

Primary Examiner—Carl D. Price
Attorney, Agent, or Firm—Burns, Doane, Swecker & Mathis

[57] ABSTRACT

In a burner for operating an internal combustion engine, a combustion chamber of a gas turbine or firing equipment, which consists essentially of at least two hollow conical partial bodies (1, 2) positioned one upon the other in the flow direction, the ignition of the air/fuel mixture forming in the hollow conical space (14) takes place by means of ignition electrodes (24a, 24b, 25a, 25b) which are placed at a location where there is a low flow velocity of the combustion air (15). This achieves the effect that the flame tongues starting from the electrode ends (25a, 25b) of the ignition electrodes (24a, 24b) can feed a flame front (7) forming at the outlet from the burner continuously and along ordered paths, i.e. paths directed in the flow direction with slight swirl in consequence of the motion of the combustion air (15), so that a stable reverse flow zone (6) forms.

5 Claims, 3 Drawing Sheets 5,249,955

BURNER AND IGNITOR ARRANGEMENT

BACKGROUND OF THE INVENTION

1. Field of the Invention

The present invention relates to a burner for the combustion of a liquid and/or gaseous fuel. More particularly, the present invention relates to the ignition of fuel in a premix type burner to provide better flame propagation and a more stable flame front.

2. Discussion of Background

In any burner for a firing system or internal combustion engine or combustion chamber of a gas turbine group, it is repeatedly found that an excessive air or mixture velocity is intrinsically always present at the ignition electrodes. Particularly in the case of premixed burners, i.e. in the case of burners in which the premixing zone is an integrated constituent part of the burner itself, such as is disclosed in EP-A1-0 321 809, it is necessary to ensure that the ignition of the fuel/air mixture takes place or proceeds at a location where there is no excessive flow velocity of the medium; at the same time it is also necessary to ensure that the propagation of the flame front or flame tongues in the direction of the outlet from the burner, where a reverse flow zone is established, takes place in a defined manner. It is also, of course, necessary to ensure that ignition takes place at a location where there is an ignitable stoichiometric, or preferably slightly sub-stoichiometric, mixture and where the initial flame formation can also be maintained until the flame front has reached said stabilization location at the outlet from the burner. As far as can be seen, particularly with respect to premixed burners of the type already mentioned, such a configuration which can satisfy the conditions postulated and can obviate the disadvantages with respect to the ignition, has not yet been proposed.

SUMMARY OF THE INVENTION

Accordingly, one object of the invention is to propose an ignition device of the type mentioned at the beginning, which permits a defined ignition behavior and ignition process.

The essential advantages of the invention may be seen in the fact that the ignition propagates in accordance with a certain process in such a way that the premixing zone is bridged in a deliberate and nonchaotic manner, i.e. the flame front at the outlet from the burner is continually fed by a tongue of flame. Because the ignition takes place at a location where there is a small velocity of the medium and because this location is relatively far from the actual combustion zone, the ignition electrodes remain cold and this greatly increases their availability and operational reliability.

A further advantage of the invention may be seen in the fact that the flame initiated in this way can be maintained better and can propagate better, the latter in the sense of a defined propagation, so that a deliberate ignition of the various stabilization zones in the burner can be achieved.

Advantageous and expedient further developments of the solution according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
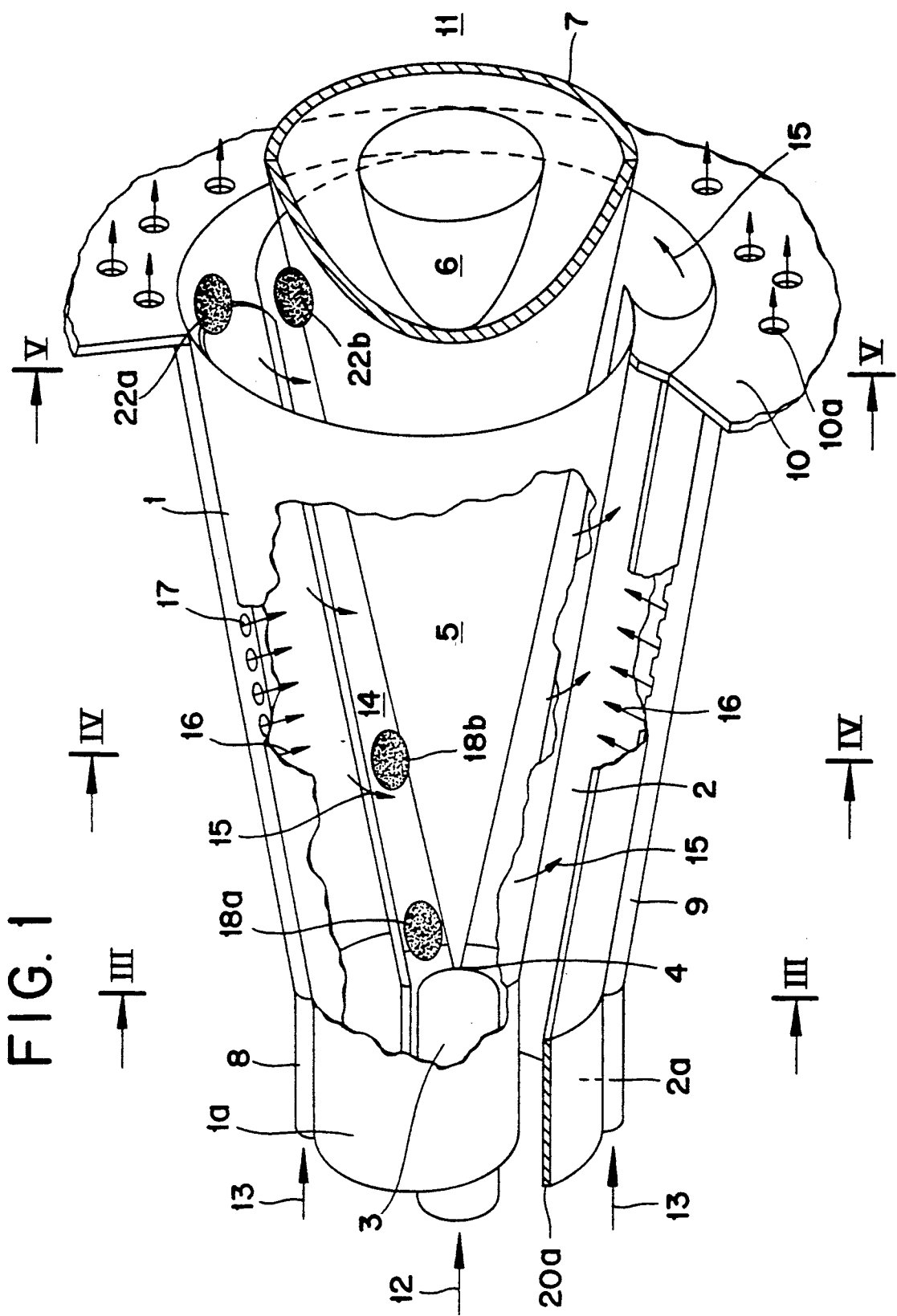
FIG. 1 shows a perspective view of a burner with integrated premixing zone.
Figure 2:
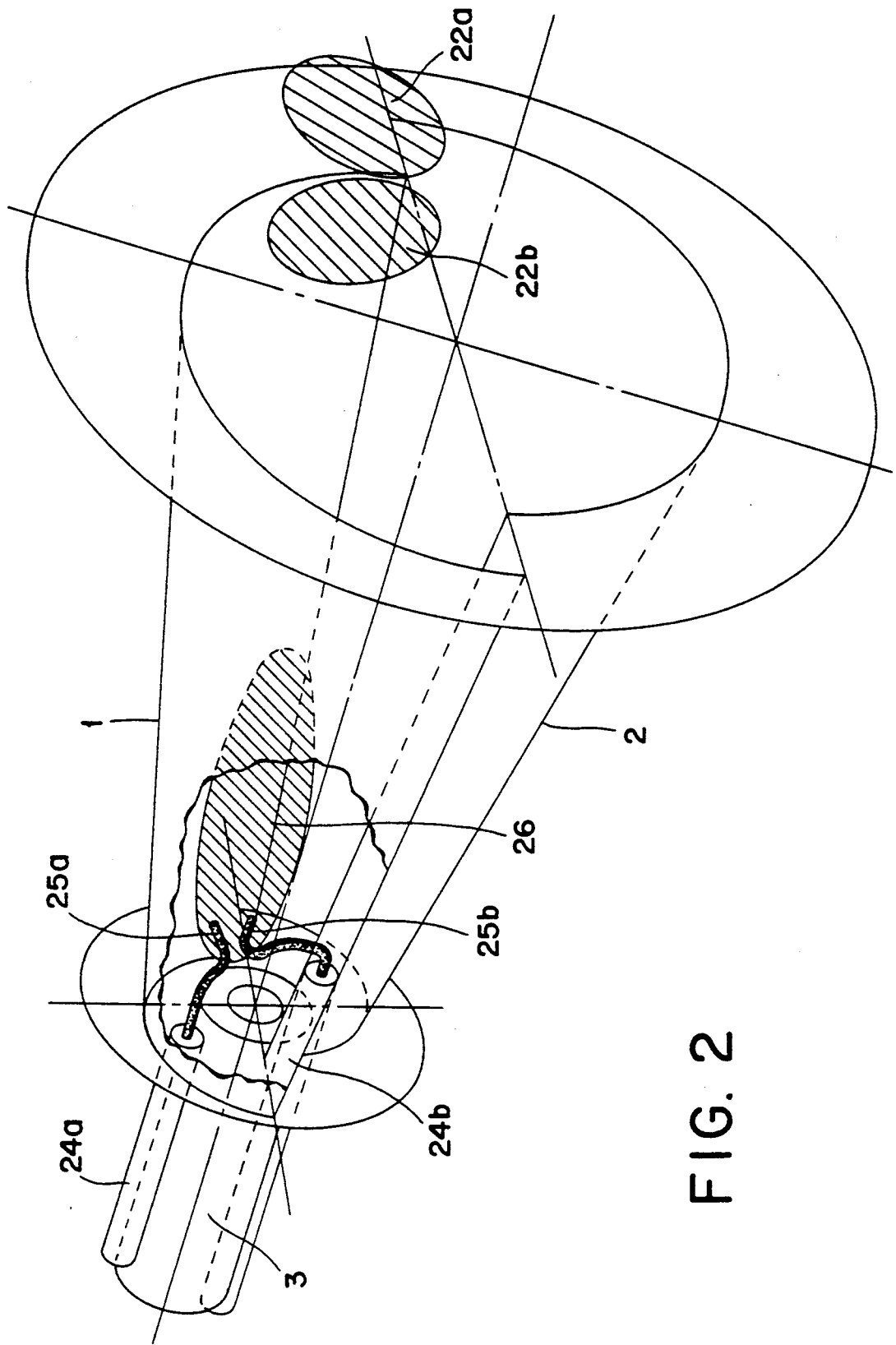
FIG. 2 shows a diagrammatic view of the burner of FIG. 1.
Figure 3:
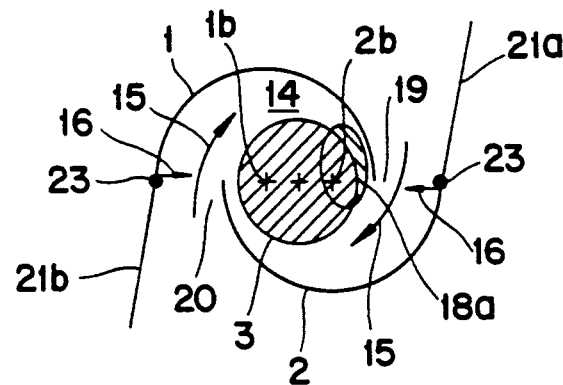
FIGS. 3, 4 and 5 show corresponding sections at the planes III—III (=FIG. 3) IV—IV (=FIG. 4) and V—V (=FIG. 5) of FIG. 1, where these sections only provide a diagrammatic presentation of the burner.
Figure 4:
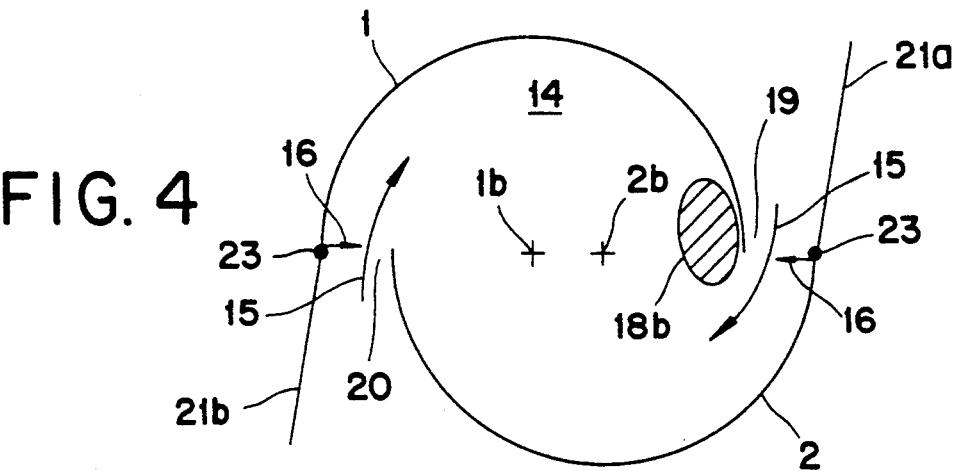
Figure 5:
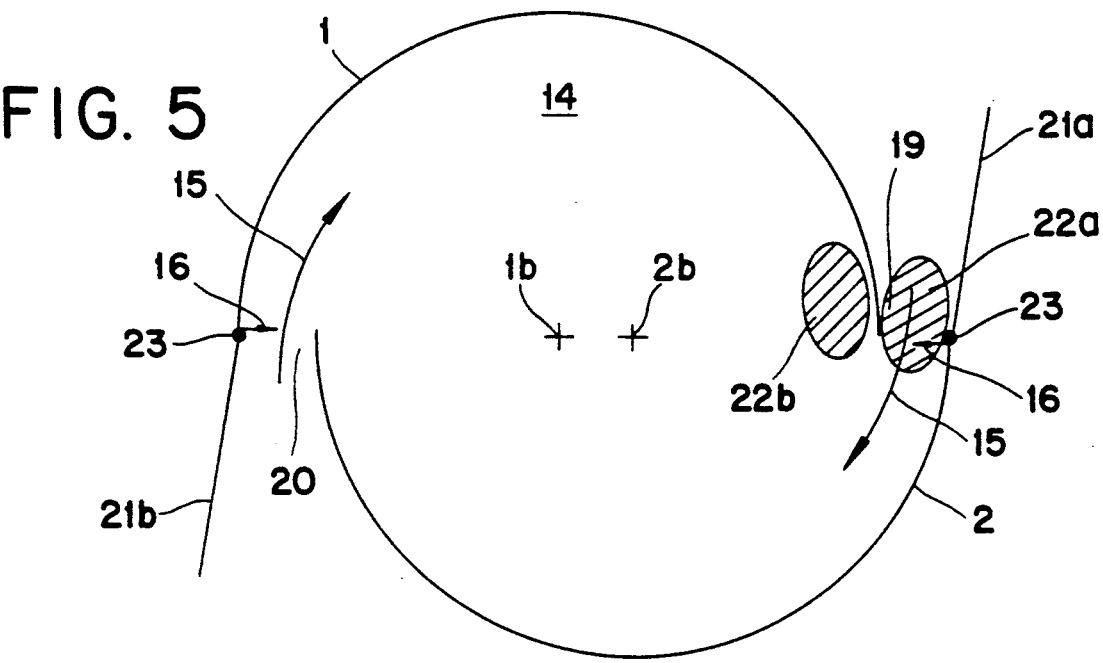

Referring now to the drawings, wherein like reference numerals and letters designate identical or corresponding parts throughout the several views, the flow direction of the media is indicated by arrows and all the elements not necessary for immediate understanding of the invention are omitted, it is advantageous for better understanding of the construction of the burner to consider the individual sections in FIG. 1 and shown in FIGS. 3-5 simultaneously with FIG. 1. Furthermore, in order to make FIG. 1 as comprehensible as possible, the guide plates 21a, 21b shown diagrammatically in FIGS. 3-5 are only indicated in FIG. 1. In the description of FIG. 1 below, reference is made as required to FIGS. 3-5 and, if need be, also to FIG. 2.

FIG. 1 shows a burner, which in itself has an integrated premixing zone, in a perspective view. The burner consists of two hollow partial semi-conical bodies 1, 2 which are located one upon the other, radially offset relative to one another with respect to their longitudinal axis of symmetry. The offset of each of the longitudinal axes of symmetry $1b$, $2b$ (FIGS. 3-5) relative to one another creates on both sides of the partial conical bodies 1, 2, an opposed inlet flow arrangement, in each case a tangential air inlet slot 19, 20 (FIGS. 3-5) through which a combustion air flow 15 flows into the internal space of the burner, i.e. into the hollow conical space 14 formed by the two partial conical bodies 1, 2. The conical shape of the partial conical bodies 1, 2 shown has a certain fixed angle in the flow direction. The partial conical bodies 1, 2 can, of course, have a progressive or degressive conical inclination in the flow direction. The two embodiments last mentioned are not included in the drawing because they are immediately obvious. Which conical shape is used in the end depends essentially on the specified combustion parameters in each case. The two partial conical bodies 1, 2 each have a cylindrical initial part $1a$, $2a$, which, by analogy with the partial conical bodies 1, 2, extend offset relative to one another so that the tangential air inlet slots 19, 20 are intrinsically continuous over the complete length of the burner. A nozzle 3, whose fuel injection location 4 coincides with the narrowest cross-section of the hollow conical space 14 formed by the two partial conical bodies 1, 2, is accommodated in this cylindrical initial part $1a$, $2a$. The size of this nozzle 3 depends fundamentally on the type of burner, on whether it is a pilot burner or a main burner, for example. The burner can, of course, be designed to be purely conical, i.e. without cylindrical initial parts $1a$, $2a$. Each of the two partial conical bodies 1, 2 has a fuel conduit 8, 9 provided with openings 17, through which, preferably, a gaseous fuel 13 is introduced. In the region of the tangential air inlet slots 19, 20, this fuel 13 mixes with the combustion air 15 flowing into the hollow conical space 14. The fuel conduits 8, 9 should therefore be placed in the tangential air inlet slots 19, 20 in such a way that there is optimum mixture formation. In consequence, the injection location of the fuel from the fuel conduits 8, 9 largely depends on the particular type of fuel and the injection of a liquid fuel therefore takes place further upstream of the inlet slots 8, 9 than the injection of a gaseous fuel. If a gaseous fuel 13 is introduced through the fuel conduits 8, 9, the mixture formation with the combustion air 15 takes place, as already indicated above, directly in the region of the air inlet slots 19, 20 at the inlet to the hollow conical space 14. The nozzle 3 can be designed for a liquid fuel as well as for a gaseous fuel. In the case of an atmospheric firing plant, a liquid fuel 12 is preferably used, this fuel being injected into the hollow conical space 14 at an acute angle in such a way that as homogeneous as possible a conical spray pattern is established in the burner outlet plane. This is only possible if the inner walls of the partial conical bodies 1, 2 are not wetted by the fuel injection 4, which may involve airblast or pressurized atomization. For this purpose, the conical liquid fuel profile 5 is enclosed by the tangentially entering combustion air flow 15 and, if required, by a further axial combustion air flow (which is not visible in the figure). In the latter case, it is important that the velocity should be small and, if necessary, this axial combustion air should be introduced into the hollow conical space downstream of the ignition electrodes. The concentration of the liquid fuel 12 is continuously reduced in the axial flow direction by the mixed in combustion air 15. In connection with the injection of the liquid fuel 12, the optimum homogeneous fuel concentration over the cross-section is achieved in the region where the vortex collapses, i.e. in the region of the reverse flow zone 6. The ignition of the mixture takes place at suitable locations, this ignition then propagating as far as the tip of the reverse flow zone 6. It is only at this position that a stable flame front 7 can occur. Blow-back of the flame into the interior of the burner—as is potentially always the case in known premixed sections and against which help is sought there by means of complicated flame holders—does not have to feared in the present case. If the combustion air is preheated, accelerated total evaporation of the liquid fuel 12 occurs before the point at the outlet of the burner is reached where the flame front 7 forms. The degree of evaporation depends, of course, on the size of the burner, on the droplet size of the fuel injected and on the temperature of the combustion air 15. Minimized pollutant emission figures occur when complete evaporation can be arranged before entry into the combustion zone. The same also applies to near-stoichiometric operation if the excess air is replaced by a recirculating exhaust gas. Tight limits have to be maintained in the design of the partial conical bodies 1, 2 with respect to the cone angle and the width of the tangential air inlet slots 19, 20 if the desired air flow field is to be produced with its reverse flow zone 6 in the region of the outlet from the burner for flame stabilization purposes. In general, it may be stated that making the air inlet slots 19, 20 smaller displaces the reverse flow zone 6 further upstream; the mixture then, however, ignites earlier. It should, however, be noted that the position of the reverse flow zone 6, once fixed, is intrinsically stable because the swirl increases in the flow direction in the region of the conical shape of the burner. The design of the burner is extremely suitable for changing the size of the tangential air inlet slots 19, 20, if required, for a given overall length of the burner. This is done by providing means which permit the partial conical bodies 1, 2 to be displaced towards or away from one another so that the distance between the two central axes 1b, 2b is reduced or increased, the gap size of the tangential air inlet slots 19, 20 also changing correspondingly—as can be best seen from FIGS. 3-5. In certain types of combustion equipment, it is also possible to push the two partial conical bodies 1, 2 spirally into one another and to displace them axially relative to one another. It is therefore possible to vary the shape and the size of the tangential air inlet slots 19, 20 arbitrarily so that the burner can be individually matched within a certain operational band width, without changing its overall length. At the combustion space end 11, the outlet opening of the burner merges into a front wall 10 in which a number of holes 10a are provided. The latter become operative as required and ensure that dilution air or cooling air is supplied to the front part of the combustion space 22. In addition, the air supply ensures that additional flame stabilization occurs at the outlet from the burner. This flame stabilization is important because otherwise there is a risk that the compactness of the flame front 7 could be lost by radial flattening. FIG. 1 also shows, in black, the preferred locations for ignition. Fundamentally, it may be stated that the ignition has to take place at a location at which it is ensured that the flame forming there bridges the premixing zone along the hollow conical space 14 in a deliberate, defined and non-chaotic manner in such a way that the flame front 7 at the outlet from the burner is continually supplied with a tongue of flame. This is only possible if the ignition locations are provided where the velocity of the medium is small so that the conditions for a compact extent of the flame tongue are created. If, in addition, the ignition location is far from the actual flame front 7, the ignition electrodes in operation there remain relatively cold throughout the operation. Two such locations are indicated by the items 18a and 18b, the positioning in space being made clear by FIGS. 3-5, which illustrate the ignition electrodes located adjacent to the tangential inlet slot 19 and along an inner edge of the inlet slot formed by the edge of the partial body 1. The electrode locations 18a and 18b may, of course, alternatively be located adjacent to the opposing inlet slot 20. The two other ignition locations preferably to be provided (22a, 22b) are in the region of the end of the burner, the ignition occurring there being placed directly in the region of its field of action. The heating of the electrodes will, of course, be higher here compared with that of the other two ignition electrodes. The positioning of the ignition electrodes 22a, 22b in space is again indicated in FIGS. 3-5.

FIG. 2 shows a diagrammatic view of the burner in which the burner-end ignition locations 22a, 22b, in particular, can be easily seen. This figure also shows the positioning of the ignition electrodes 24a, 24b for the ignition location 18a. The electrode ends 25a, 25b coincide with the respective ignition location, the two ends of these electrodes 24a, 24b preferably having a distance apart of approximately 4 mm. For different ignition locations, the ignition electrodes will of course have a different configuration. The way in which the flame tongue 26 develops and proceeds in a compact manner along the air inlet slot in the flow direction can also be seen. Due to the combustion air 15 flowing in through the tangential air inlet slots 19, 20, this flame tongue 26 is forced to accept a slight swirl motion.

The geometric configuration of the guide plates 21a, 21b and, once again, the precise positioning of the ignition locations 18a, 18b, 22a, 22b may be seen in FIGS. 3-5. The guide plates 21a, 21b have flow inlet functions and, depending on their length, extend the respective end of the partial conical bodies 1, 2 in the incident flow direction relative to the combustion air 15. The channeling of the combustion air 15 into the hollow conical space 14 can be optimized by opening or closing the guide plates 21a, 21b about a centre of rotation 23 located in the region of the inlet of this duct into the hollow conical space 14. This is particularly necessary when the original gap size of the tangential air inlet slots 19, 20 is changed. These dynamic arrangements can, of course, also be provided statically by guide plates forming, as required, a fixed constituent part of the partial conical bodies 1, 2. Similarly, the burner can also be operated without guide plates, or other auxiliary means can be provided for this purpose.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A burner for combustion of a fuel comprising:
   at least two hollow conical partial bodies positioned one upon the other in the flow direction to form a hollow conical space, the longitudinal axes of symmetry of said partial bodies extending radially offset relative to one another to form tangential air inlet slots with opposite flow directions for producing a tangential combustion air flow;
   at least one nozzle for injecting a fuel being placed in the hollow conical space formed by the conical partial bodies; and
   electrode ends of ignition electrodes are placed in the hollow conical space at a location with low combustion air flow velocity adjacent to a tangential inlet slot along an inner edge of the inlet slot.

2. The burner as claimed in claim 1, wherein the nozzle is an air-blast nozzle.

3. The burner as claimed in claim 1, wherein the electrode ends of the ignition electrodes are located in the region of the tangential air inlet slots.

4. A burner as claimed in claim 1, further comprising a means for throttling the combustion air flow to achieve the low flow velocity.

5. The burner as claimed in claim 1, further comprising a means for introducing a further fuel in the region of the tangential air inlet slots.

* * * * *